United States Patent Office 3,344,179
Patented Sept. 26, 1967

3,344,179
METHOD FOR SYNTHESIZING DL-GLUTAMIC ACID AND ITS ALKYL DERIVATIVES
Yasunobu Takahashi, Tokyo, Japan, assignor to Asahi Kasei Kogyo Kabushiki Kaisha, Osaka, Japan, a corporation of Japan
No Drawing. Filed Dec. 16, 1964, Ser. No. 418,904
Claims priority, application Japan, Dec. 17, 1963, 38/67,564
11 Claims. (Cl. 260—534)

ABSTRACT OF THE DISCLOSURE

A method for synthesizing DL-glutamic acid and alkyl derivatives thereof by aminating α-hydroxyglutaronitrile or the corresponding alkyl substitutes thereof, cooling the resulting reaction product to below 30° C. immediately after the amination, and then hydrolyzing the resulting reaction product, the resulting hydrolyzate being neutralized to separate the free acids, if desired.

---

This invention relates to a method for obtaining and isolating DL-gultamic acid or its derivatives, which comprises aminating α-hydroxyglutaronitrile or its derivatives represented by the formula

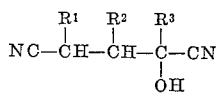

wherein $R^1$, $R^2$ and $R^3$ are independently selected from the group consisting of hydrogen and alkyl groups of 1~5 carbon atoms with aqua ammonia continuously under pressure, obtaining thereafter hydrolysates comprising the dialkali salts of the compounds represented by the formula

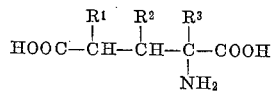

by means of hydroylsis with alkali, and finally adjusting pH to about the isoelectric point of the compounds mentioned above.

Glutamic acid and its alkyl substitutes are important for use in the chemical seasoning of foods, in medicine and as a treating agent for fibers, and α-aminoglutaronitrile is expected to be used for various purposes such as intermediates for organic synthesis and the raw material for polymer.

Research has previously been conducted on the synthesis of DL-glutamic acid, generally, by amination involving aqua ammonia or liquid ammonia which are reacted with starting materials. Because this reaction is conducted over a long period of time at high temperature, undesirable reactions such as side reaction and decomposition occur. In addition, since the reaction mixture is remarkably colored, degradation of the quality of the final product and lower yield occur.

The object of the present invention is to eliminate the disadvantages of the prior art and to obtain DL-glutamic acid or its derivatives from α-hydroxyglutaronitrile or its derivatives in high yield. The present inventor has now found a process for obtaining the desired products in high yield, eliminating the above mentioned disadvantages, by the embodiment of the reaction conditions and the after-treatment of the present invention.

According to the present invention, DL-glutamic acid and its derivatives can be synthesized by using α-hydroxyglutaronitrile or its alkyl substitutes as the starting materials. The reaction sequence is as follows:

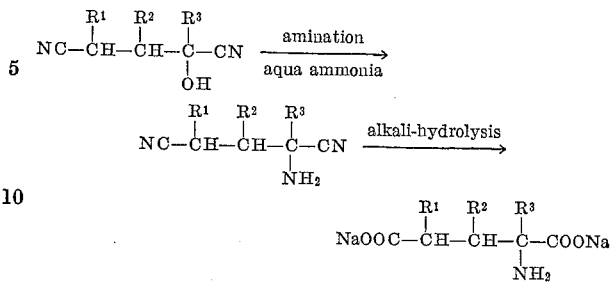

The α-hydroxyglutaronitrile or alkyl derivatives thereof can be readily obtained in high yield by the reaction of acrolein cyanohydrin or the corresponding alkyl derivative thereof with cyanic acid.

For example, the α-hydroxyglutaronitriles can be efficiently synthesized by dissolving acrolein cyanohydrin or its derivatives having the formula:

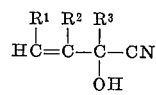

wherein $R^1$, $R^2$ and $R^3$ represent hydrogen or alkyl groups of 1–5 carbon atoms, in an organic solvent such as ether or alcohol etc. in an amount of less than 40 percent, and reacting said acrolein cyanohydrin or derivatives thereof with cyanic acid at 150° C. in the presence of an alkaline catalyst in an amount of $10^{-1} \sim 10^{-4}$ equivalent per mol of cyanohydrin.

According to the present invention, first, with regard to the amination reaction, it is necessary that, after α-hydroxyglutaronitrile or an alkyl derivative thereof is dissolved in a solvent such as water, alcohol or dioxane, it is mixed sufficiently with aqua ammonia and then heated as quickly as possible in a pressure-vessel and maintained at the optimum temperature for a limited time, the after-treatment being effected according to the present invention as described below. The α-hydroxyglutaronitrile may also be aminated per se, that is, not in solution. The aqua ammonia used can be the commercially available 28% aqueous solution, but may be a more or less concentrated solution. The molar amount of ammonia used must be over 3.5 times, preferably over 7 times the molar amount of said α-hydroxyglutaronitrile, and the reaction temperature must be not less than 40° C., and not more than 250° C. It is possible to avoid colorization due to the decomposition of the product and to improve the yield by completing the reaction within an extremely limited short time at a somewhat higher reaction temperature than that given above. The preferred reaction conditions for the present invention are a reaction time of 0.5 to 20 minutes at a temperature of 70° C. to 150° C.

According to the present invention, the reaction product after the termination of the amination reaction is immediately alkali-hydrolysed or, after being cooled and stored under refrigeration, it can be hydrolysed later in a separate step. In the case of a later hydrolysis, the excess ammonia may be removed initially by heating, but care must be taken to avoid prolonged heating for that purpose. In any event, after the amination, the reaction product must not be allowed to stand for over 180 minutes at over 40° C., and it is necessary that the reaction product is preferably hydrolysed immediately within a few minutes, or that it is kept cool at the temperature below 30° C., preferably, below 10° C.

In order to satisfy the above characteristic reaction conditions of the present invention, it is convenient to control the reaction by means of a continuous apparatus. Thereby, one can maintain the yields of alkyl-substituted glutamic acid at a high level and obtain a high quality product.

There will next be considered the conditions for hydrolysis of the amination product. The reaction product after amination is preferably hydrolysed in a closed vessel. Since the product contains much unreacted ammonia and a further 2 mols of ammonia are formed during the hydrolysis per mole of product, the temperature of the reaction liquid falls, due to the vaporization of the above mentioned ammonia. The above effect makes careful control of the hydrolysis temperature difficult and the reaction time is therefore unavoidably prolonged. Of course, if the reaction vessel is sufficiently controlled thermally by means of a suitable heating bath, the hydrolysis can be effected under atmospheric pressure. When the velocity of the hydrolysis is reduced, decomposition of aminoglutaronitrile occurs, and the yield of alkyl-substituted glutamic acid is greatly lowered. In order to increase the velocity of hydrolysis the following are necessary:

(1) The amount of alkali to be used should be large.
(2) The alkali concentration during the hydrolysis is to be increased.
(3) The type of reaction in whose liquid the concentration of aminonitrile is kept small, is chosen.
(4) Thorough mixing of alkali and aminonitrile should be effected.

In the present invention, the amount of alkali required is above 2, preferably between 2.1 and 3.0 equivalents per mole of substituted α-aminoglutaronitrile. More alkali is not economical. The desired alkali ion concentration is above 0.1 mole/l., preferably above 1.0 mole/l. In addition, it is necessary to choose the type of reaction apparatus so as to satisfy the conditions said above in (3) and (4). The reaction temperature for the hydrolysis is from 60° C. to 200° C., preferably from 95° C. to 159° C. After hydrolysis, the DL-glutamic acid or the alkyl derivative thereof is precipitated by adjusting the pH to the isoelectric point (for DL-glutamic acid, pH=3.2) with the addition of acid according to usual manner, after concentrating the hydrolysate.

According to the method of the present invention, one can by choosing suitable reaction conditions and by using a continuous reaction apparatus, carry out the amination, hydrolysis and neutralization reactions continuously.

According to the present process β-pentyl-DL-glutamic acid, β-ethyl-DL-glutamic acid, DL-glutamic acid, α-methyl-DL-glutamic acid, β-methyl-DL-glutamic acid, γ-methyl-DL-glutamic acid and γ-ethyl-DL-glutamic acid were obtained in high yields from the corresponding β-pentyl-α-hydroxyglutaronitrile, β-ethyl-α-hydroxyglutaronitrile, α-hydroxyglutaronitrile, α-methyl-α-hydroxyglutaronitrile, β-methyl-α-hydroxyglutaronitrile, γ-methyl-α-hydroxyglutaronitrile and γ-ethyl-α-hydroxyglutaronitrile.

There will now be described examples of the present invention in which the reaction conditions are intended only to show the working of the process by example, and not to unduly limit the scope of the present invention which is defined by the appended claims.

*Example 1*

70 g. of crotonaldehyde, 200 g. of 99% methanol, and 0.2 g. of pyridine were charged into an autoclave of 500 cc. capacity and 60 g. of cyanic acid were added thereto at 0° C. The resulting mixture was, after being allowed to stand for 10 minutes, heated at 110° C. and maintained thereat for 15 minutes. After it was immediately cooled to 20° C., the reaction product was withdrawn from the autoclave and 50 g. thereof was transferred to an autoclave of 200 cc. capacity and 50 g. of 28% aqua ammonia was added thereto. Immediately it was heated to 105° C. and then it was maintained at 103° to 106° C. for 6 minutes. Immediately thereafter it was cooled to 20° C. and the content is transferred to a dropping funnel from which it was dropped into a hydrolysis flask containing 140 g. of 10% caustic soda solution preheated to 105° C. The temperature of hydrolysis was maintained at 100° to 105° C. After the dropping was completed, heating was continued for an additional 10 minutes. After cooling, a portion of the hydrolysis product was analysed. The analysis for γ-methylglutamic acid was carried out according to the method of Pope Stevens. The yield was 87% based on starting crotonaldehyde.

*Example 2*

49.8 parts of α-hydroxyglutaronitrile (purity: 93%) was mixed with 0.2 part of phosphoric acid and 50 parts of water, and charged into a first storage vessel. To a second storage vessel, 28% aqua ammonia was charged. Immediately thereafter, 1 part per minute from the first vessel, and 2 parts per minute from the second vessel was, by means of a controlled volume pump, mixed, the mixture was passed through a high pressure reaction vessel maintained at 120° C.±1° C., and thereafter was mixed in a mixing vessel with 4 parts per minute of a 10% caustic soda solution preheated to 100° C. from a third storage vessel. After the mixing, the mixture was passed through a hydrolysis reaction vessel adjusted to a temperature of 120° C. and was allowed to remain therein for 30 minutes, after which it was cooled by passing it through a cooler, after which the product was received in a receiving vessel. The analysis of the reaction product obtained showed that DL-glutamic acid was obtained in a yield of 97% based on α-hydroxyglutaronitrile.

*Example 3*

A mixture of 59 parts of β-methyl-α-hydroxyglutaronitrile (purity: 97%) and 200 parts of 25% aqua ammonia was rapidly heated for five minutes with stirring in an autoclave of 500 cc. capacity maintained at 140° C. Then the autoclave was cooled and opened. The liquid content was charged into a dropping vessel, from which it was added with stirring to a hydrolysis vessel containing 400 parts of caustic soda solution preheated to 105° C. After this addition it was heated for 30 minutes and cooled. The analysis of a portion of the reaction product showed that β-methylglutamic acid was obtained in a yield of 97% based on β-methyl-α-hydroxyglutaronitrile.

*Example 4*

α-Methyl - α - hydroxyglutaronitrile, prepared from 35 parts of methylvinylketone was aminated and hydrolyzed in the same manner as in Example 3 and α-methylglutamic acid was obtained in a yield of 89%.

What I claim is:
1. A method for producing DL-glutamic acid or alkyl derivatives thereof, said method comprising aminating a compound of the formula:

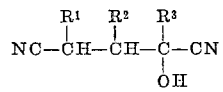

wherein $R^1$, $R^2$ and $R^3$ are independently selected from the group consisting of hydrogen and alkyl groups of 1 to 5 carbon atoms, with aqua ammonia having a concentration of about 28% by weight at a temperature of 40° to 250° C. under super-atmospheric pressure, the molar ratio of aqua ammonia to said compound being at least 3.5:1 to obtain a product including an intermediate compound of the formula

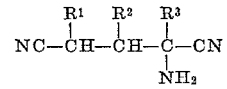

wherein $R^1$, $R^2$ and $R^3$ are as defined above, cooling said product to a temperature below 30° C. immediately after the said amination, hydrolyzing the product with 2 to 3 molar equivalents of alkali, said alkali having a concentration of 0.1 to 10 molar at a temperature of 60° to 200°

C. to obtain a hydrolysate comprising the dialkali salt of an acid having the formula

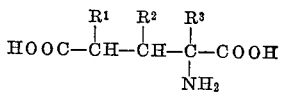

wherein $R^1$, $R^2$ and $R^3$ are as defined above and freeing the acid by neutralizing said dialkali salt.

2. A method according to claim 1, wherein the molar ratio of aqua ammonia to said compound is 3.5–13.5:1.

3. A method according to claim 1, wherein aminating is effected at a temperature of 70° to 150° C.

4. A method according to claim 1, wherein hydrolyzing is effected with 2.5 to 3 molar equivalents of alkali.

5. A method according to claim 1, wherein the concentration of the alkali is at least 1 molar.

6. A method according to claim 1, wherein the hydrolyzing is effected at a temperature of 95° to 159° C.

7. A method according to claim 1 comprising diluting the product including the intermediate compound before hydrolyzing same.

8. A method according to claim 1, wherein aminating is effected for 0.5 to 20 minutes at a temperature of 70° to 150° C.

9. A method according to claim 1, wherein the molar ratio of aqua ammonia to said compound is at least 7:1.

10. A method according to claim 1, wherein the reaction product is cooled to a temperature below 10° C.

11. A method according to claim 1 comprising dissolving the compound to be aminated in a solvent selected from the group consisting of water, alcohol and dioxane.

References Cited
UNITED STATES PATENTS 3,168,558 2/1965 Kurhajec et al. __ 260—465.5 X
3,243,440 3/1966 Noyori et al. _____ 260—534 X JOSEPH P. BRUST, *Primary Examiner.*